United States Patent
Lin

(10) Patent No.: US 9,459,510 B2
(45) Date of Patent: Oct. 4, 2016

(54) COLOR DISPLAY DEVICE WITH COLOR FILTERS

(71) Applicant: SiPix Imaging, Inc., Fremont, CA (US)

(72) Inventor: Craig Lin, Oakland, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 14/279,210

(22) Filed: May 15, 2014

(65) Prior Publication Data

US 2014/0340736 A1  Nov. 20, 2014

Related U.S. Application Data

(60) Provisional application No. 61/824,901, filed on May 17, 2013.

(51) Int. Cl.
| | |
|---|---|
| *G02B 26/00* | (2006.01) |
| *G02F 1/03* | (2006.01) |
| *G02F 1/07* | (2006.01) |
| *G09G 3/34* | (2006.01) |
| *G02F 1/167* | (2006.01) |
| *G02F 1/1335* | (2006.01) |

(52) U.S. Cl.
CPC ......... *G02F 1/167* (2013.01); *G02F 1/133514* (2013.01); *G02F 2001/1678* (2013.01)

(58) Field of Classification Search
USPC .................. 345/107, 108; 359/242, 245–247, 359/267–272, 290–292, 295, 296, 298
See application file for complete search history.

(56) References Cited

U.S. PATENT DOCUMENTS

| | | | |
|---|---|---|---|
| 3,756,693 | A | 9/1973 | Ota |
| 3,892,568 | A | 7/1975 | Ota |
| 4,298,448 | A | 11/1981 | Muller et al. |
| 5,378,574 | A | 1/1995 | Winnik et al. |
| 5,980,719 | A | 11/1999 | Cherukuri et al. |
| 6,198,809 | B1 | 3/2001 | Disanto et al. |
| 6,337,761 | B1 | 1/2002 | Rogers et al. |
| 6,373,461 | B1 | 4/2002 | Hasegawa et al. |
| 6,486,866 | B1 | 11/2002 | Kuwahara et al. |
| 6,517,618 | B2 | 2/2003 | Foucher et al. |
| 6,525,866 | B1 | 2/2003 | Lin et al. |
| 6,538,801 | B2 | 3/2003 | Jacobson et al. |
| 6,600,534 | B1 | 7/2003 | Tanaka et al. |
| 6,650,462 | B2 | 11/2003 | Katase |
| 6,680,726 | B2 | 1/2004 | Gordon et al. |

(Continued)

FOREIGN PATENT DOCUMENTS

| | | |
|---|---|---|
| CN | 1705907 A | 12/2005 |
| JP | 2006343458 | 12/2006 |

(Continued)

OTHER PUBLICATIONS

U.S. Appl. No. 14/242,793, Apr. 1, 2014, Wang et al.

(Continued)

*Primary Examiner* — Joseph P Martinez
*Assistant Examiner* — Brandi Thomas
(74) *Attorney, Agent, or Firm* — Perkins Coie LLP

(57) ABSTRACT

The present invention provides a multicolor display device which can display high quality color states. More specifically, an electrophoretic fluid is provided which comprises three or four types of particles and color filters are placed on the viewing side of the display device.

20 Claims, 19 Drawing Sheets

(56) References Cited

U.S. PATENT DOCUMENTS

| | | | |
|---|---|---|---|
| 6,693,620 B1 | 2/2004 | Herb et al. |
| 6,704,133 B2 | 3/2004 | Gates et al. |
| 6,724,521 B2 | 4/2004 | Nakao et al. |
| 6,729,718 B2 | 5/2004 | Goto et al. |
| 6,751,007 B2 | 6/2004 | Liang et al. |
| 6,751,008 B2 | 6/2004 | Liang et al. |
| 6,781,745 B2 | 8/2004 | Chung et al. |
| 6,829,078 B2 | 12/2004 | Liang et al. |
| 6,850,357 B2 | 2/2005 | Kaneko et al. |
| 6,864,875 B2 | 3/2005 | Drzaic et al. |
| 6,876,486 B2 | 4/2005 | Hiraoka et al. |
| 6,930,818 B1 | 8/2005 | Liang et al. |
| 6,947,203 B2 | 9/2005 | Kanbe |
| 6,967,762 B2 | 11/2005 | Machida et al. |
| 6,987,503 B2 | 1/2006 | Inoue |
| 6,987,605 B2 | 1/2006 | Liang et al. |
| 7,009,756 B2 | 3/2006 | Kishi et al. |
| 7,019,889 B2 | 3/2006 | Katase |
| 7,034,987 B2 | 4/2006 | Schlangen |
| 7,038,655 B2 | 5/2006 | Herb et al. |
| 7,046,228 B2 | 5/2006 | Liang et al. |
| 7,050,218 B2 | 5/2006 | Kanbe |
| 7,057,600 B2 | 6/2006 | Goden |
| 7,057,798 B2 | 6/2006 | Ukigaya |
| 7,075,502 B1 | 7/2006 | Drzaic et al. |
| 7,116,466 B2 | 10/2006 | Whitesides et al. |
| 7,226,550 B2 | 6/2007 | Hou et al. |
| 7,259,744 B2 | 8/2007 | Arango et al. |
| 7,271,947 B2 | 9/2007 | Liang et al. |
| 7,283,119 B2 | 10/2007 | Kishi |
| 7,292,386 B2 | 11/2007 | Kanbe |
| 7,303,818 B2 | 12/2007 | Minami |
| 7,312,916 B2 | 12/2007 | Pullen et al. |
| 7,342,556 B2 | 3/2008 | Oue et al. |
| 7,345,810 B2 | 3/2008 | Chopra et al. |
| 7,352,353 B2 | 4/2008 | Albert et al. |
| 7,365,732 B2 | 4/2008 | Matsuda et al. |
| 7,382,351 B2 | 6/2008 | Kishi |
| 7,411,719 B2 | 8/2008 | Paolini et al. |
| 7,417,787 B2 | 8/2008 | Chopra et al. |
| 7,420,549 B2 | 9/2008 | Jacobson et al. |
| 7,433,113 B2 | 10/2008 | Chopra et al. |
| 7,474,295 B2 | 1/2009 | Matsuda |
| 7,492,505 B2 | 2/2009 | Liang et al. |
| 7,495,821 B2 | 2/2009 | Yamakita et al. |
| 7,502,162 B2 | 3/2009 | Lin et al. |
| 7,545,557 B2 | 6/2009 | Iftime et al. |
| 7,548,291 B2 | 6/2009 | Lee et al. |
| 7,557,981 B2 | 7/2009 | Liang et al. |
| 7,580,025 B2 | 8/2009 | Nakai et al. |
| 7,605,972 B2 | 10/2009 | Kawai et al. |
| 7,609,435 B2 | 10/2009 | Moriyama et al. |
| 7,626,185 B2 | 12/2009 | Krak et al. |
| 7,636,076 B2 | 12/2009 | Hung et al. |
| 7,652,656 B2 | 1/2010 | Chopra et al. |
| 7,656,576 B2 | 2/2010 | Suwabe et al. |
| 7,679,599 B2 | 3/2010 | Kawai |
| 7,686,463 B2 | 3/2010 | Goto |
| 7,760,419 B2 | 7/2010 | Lee |
| 7,782,292 B2 | 8/2010 | Miyasaka et al. |
| 7,808,696 B2 | 10/2010 | Lee et al. |
| 7,830,592 B1 | 11/2010 | Sprague et al. |
| 7,848,009 B2 | 12/2010 | Machida et al. |
| 7,852,547 B2 | 12/2010 | Kim |
| 7,852,548 B2 | 12/2010 | Roh |
| 7,907,327 B2 | 3/2011 | Jang et al. |
| 7,911,681 B2 | 3/2011 | Ikegami et al. |
| 7,982,941 B2 | 7/2011 | Lin et al. |
| 8,040,594 B2 | 10/2011 | Paolini, Jr. et al. |
| 8,054,288 B2 | 11/2011 | Sugita et al. |
| 8,067,305 B2 | 11/2011 | Zafiropoulo et al. |
| 8,068,090 B2 | 11/2011 | Machida et al. |
| 8,072,675 B2 | 12/2011 | Lin et al. |
| 8,081,375 B2 | 12/2011 | Komatsu et al. |
| 8,089,686 B2 | 1/2012 | Addington et al. |
| 8,115,729 B2 | 2/2012 | Danner et al. |
| 8,120,838 B2 | 2/2012 | Lin et al. |
| 8,159,636 B2 | 4/2012 | Sun et al. |
| 8,164,823 B2 | 4/2012 | Ikegami et al. |
| 8,169,690 B2 | 5/2012 | Lin et al. |
| 8,174,491 B2 | 5/2012 | Machida et al. |
| 8,174,492 B2 | 5/2012 | Kim et al. |
| 8,237,892 B1 | 8/2012 | Sprague et al. |
| 8,243,013 B1 | 8/2012 | Sprague et al. |
| 8,355,196 B2 | 1/2013 | Yan et al. |
| 8,395,836 B2 | 3/2013 | Lin et al. |
| 8,422,116 B2 | 4/2013 | Sprague et al. |
| 8,441,713 B2 | 5/2013 | Kawashima et al. |
| 8,441,714 B2 | 5/2013 | Paolini, Jr. et al. |
| 8,466,852 B2 | 6/2013 | Drzaic et al. |
| 8,477,405 B2 | 7/2013 | Ishii et al. |
| 8,491,767 B2 | 7/2013 | Gibson et al. |
| 8,503,063 B2 | 8/2013 | Sprague |
| 8,520,296 B2 | 8/2013 | Wang et al. |
| 8,537,104 B2 | 9/2013 | Markvoort et al. |
| 8,570,272 B2 | 10/2013 | Hsieh et al. |
| 8,570,639 B2 | 10/2013 | Masuzawa et al. |
| 8,574,937 B2 | 11/2013 | Shi |
| 8,605,354 B2 | 12/2013 | Zhang et al. |
| 8,610,998 B2 | 12/2013 | Baisch et al. |
| 8,629,832 B2 | 1/2014 | Tanabe |
| 8,649,084 B2 | 2/2014 | Wang et al. |
| 8,670,174 B2 | 3/2014 | Sprague et al. |
| 8,681,191 B2 | 3/2014 | Yang et al. |
| 8,687,265 B2 | 4/2014 | Ahn et al. |
| 8,704,754 B2 | 4/2014 | Machida et al. |
| 8,704,756 B2 | 4/2014 | Lin |
| 8,717,662 B2 | 5/2014 | Komatsu |
| 8,717,664 B2 | 5/2014 | Wang et al. |
| 8,797,258 B2 | 8/2014 | Sprague |
| 8,797,636 B2 | 8/2014 | Yang et al. |
| 8,797,637 B2 | 8/2014 | Fujishiro et al. |
| 8,810,899 B2 | 8/2014 | Sprague et al. |
| 8,902,491 B2 | 12/2014 | Wang et al. |
| 8,963,903 B2 | 2/2015 | Sakamoto et al. |
| 8,964,282 B2 | 2/2015 | Wang et al. |
| 8,988,764 B2 | 3/2015 | Abe et al. |
| 9,013,516 B2 | 4/2015 | Sakamoto et al. |
| 9,052,564 B2 | 6/2015 | Sprague et al. |
| 2001/0035926 A1 | 11/2001 | Yamaguchi et al. |
| 2002/0180688 A1* | 12/2002 | Drzaic et al. ............... 345/107 |
| 2004/0085619 A1 | 5/2004 | Wu et al. |
| 2007/0002008 A1 | 1/2007 | Tam |
| 2007/0080928 A1 | 4/2007 | Ishii et al. |
| 2007/0273637 A1 | 11/2007 | Zhou et al. |
| 2008/0042928 A1* | 2/2008 | Schlangen et al. ............ 345/55 |
| 2008/0062159 A1 | 3/2008 | Roh et al. |
| 2008/0117165 A1 | 5/2008 | Machida et al. |
| 2008/0174531 A1 | 7/2008 | Ash |
| 2009/0153942 A1 | 6/2009 | Daniel et al. |
| 2009/0184897 A1 | 7/2009 | Miyamoto |
| 2009/0311484 A1 | 12/2009 | Mclellan et al. |
| 2010/0103502 A1 | 4/2010 | Jacobson et al. |
| 2010/0283804 A1 | 11/2010 | Sprague et al. |
| 2011/0043543 A1 | 2/2011 | Chen et al. |
| 2011/0175939 A1 | 7/2011 | Moriyama et al. |
| 2011/0199671 A1 | 8/2011 | Amundson et al. |
| 2011/0217639 A1 | 9/2011 | Sprague |
| 2011/0234557 A1 | 9/2011 | Yang et al. |
| 2011/0261433 A1 | 10/2011 | Sprague et al. |
| 2011/0285746 A1* | 11/2011 | Swic ........................ 345/597 |
| 2012/0194899 A1 | 8/2012 | Zhang |
| 2012/0299947 A1 | 11/2012 | Tsuda et al. |
| 2012/0307346 A1 | 12/2012 | Sprague |
| 2013/0208338 A1 | 8/2013 | Wang et al. |
| 2013/0278995 A1 | 10/2013 | Drzaic et al. |
| 2013/0300727 A1 | 11/2013 | Lin et al. |
| 2014/0011913 A1 | 1/2014 | Du et al. |
| 2014/0055840 A1 | 2/2014 | Zang et al. |
| 2014/0078036 A1 | 3/2014 | Zhang et al. |
| 2014/0092465 A1* | 4/2014 | Wang et al. ................. 359/296 |
| 2014/0092466 A1 | 4/2014 | Wang et al. |
| 2014/0313566 A1 | 10/2014 | Du et al. |
| 2014/0340735 A1 | 11/2014 | Lin et al. |

(56) References Cited

U.S. PATENT DOCUMENTS

2014/0340737 A1   11/2014   Sprague
2014/0347407 A1   11/2014   Wang et al.
2015/0234250 A1    8/2015   Lin et al.

FOREIGN PATENT DOCUMENTS

| JP | 2007033710 | 2/2007 |
|---|---|---|
| JP | 2007033710 A | 2/2007 |
| JP | 2008033000 | 2/2008 |
| JP | 2008129179 | 6/2008 |
| JP | 2008209589 | 9/2008 |
| JP | 2009116041 | 5/2009 |
| JP | 2009192637 | 8/2009 |
| JP | 2010072617 | 4/2010 |
| JP | 2010128505 | 6/2010 |
| JP | 2011158783 | 8/2011 |
| KR | 10-2007-0082680 | 8/2007 |
| KR | 10-2008-0023913 | 3/2008 |
| KR | 10-2011-0103765 | 9/2011 |
| KR | 10-2011-0112329 | 10/2011 |
| KR | 10-1232146 | 2/2013 |
| TW | 201022816 A | 6/2010 |
| TW | 201122697 | 7/2011 |
| TW | 201237529 | 9/2012 |
| TW | 201239497 A | 10/2012 |
| WO | WO 99-53373 | 10/1999 |
| WO | WO 2003-016993 | 2/2003 |

OTHER PUBLICATIONS

U.S. Appl. No. 14/279,173, May 15, 2014, Craig Lin et al.
U.S. Appl. No. 14/309,727, Jun. 19, 2014, Sprague.
PCT/US2014/038247, PCT Notification of Transmittal of the International Search Report and the Written Opinion of the International Searching Authority, or the Declaration, mailed on Sep. 2, 2014.
U.S. Appl. No. 14/505,441, Oct. 2, 2014, Wang et al.
U.S. Appl. No. 14/596,160, Jan. 13, 2015, Chan et al.
U.S. Appl. No. 14/626,552, Feb. 19, 2015, Craig Lin et al.
U.S. Appl. No. 14/794,689, Jul. 8, 2015, Chan et al.

* cited by examiner

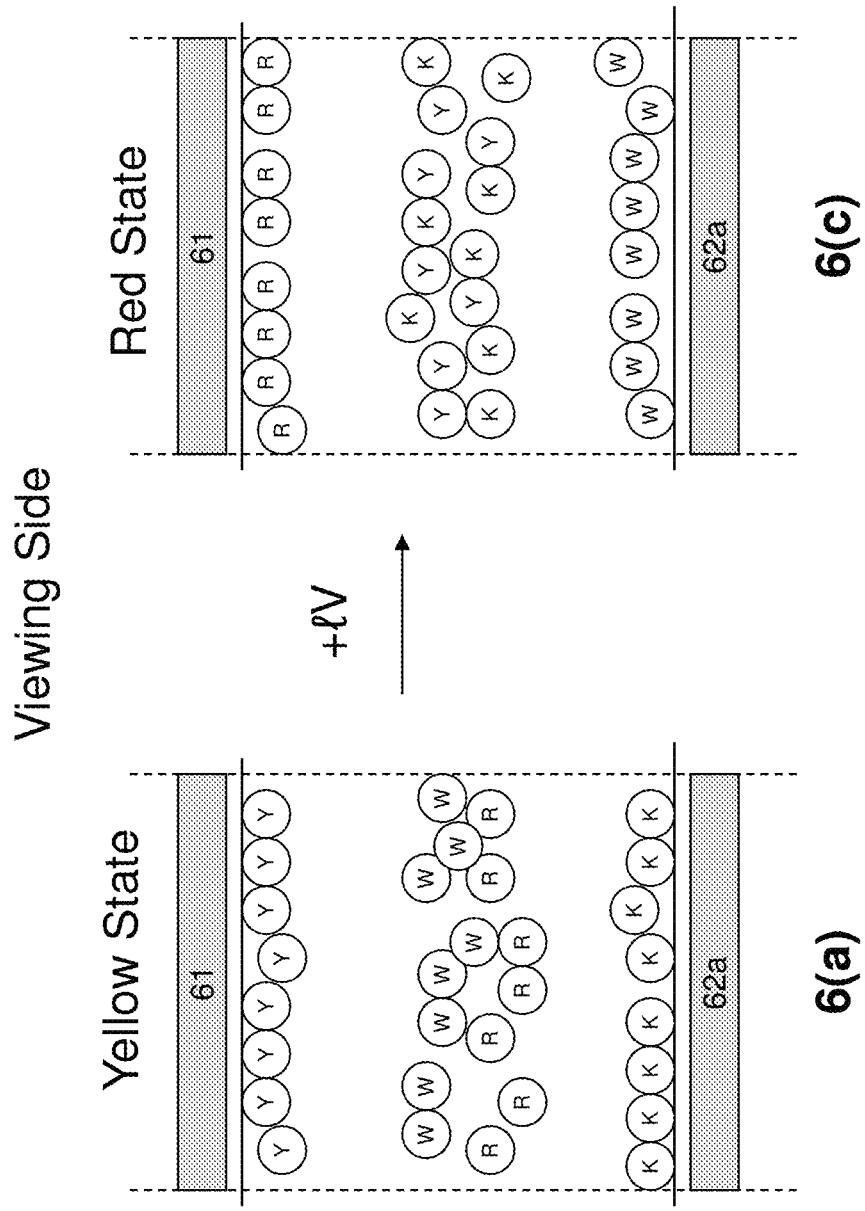

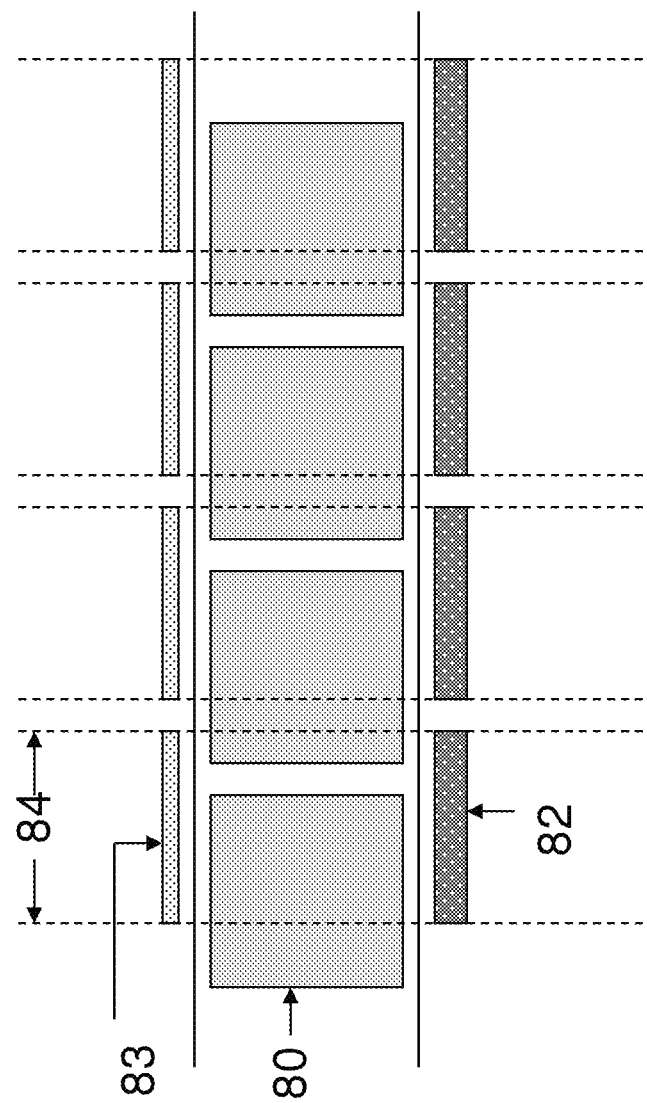

COLOR DISPLAY DEVICE WITH COLOR FILTERS

This application claims the benefit of U.S. Provisional Application No. 61/824,901, filed May 17, 2013; the content of which is incorporated herein by reference in its entirety.

FIELD OF THE INVENTION

The present invention is directed to color display devices which can display high quality color states, and electrophoretic fluids for such electrophoretic displays.

BACKGROUND OF THE INVENTION

In order to achieve a color display, color filters are often used. The most common approach is to add color filters on top of black/white sub-pixels of a pixellated display to display the red, green and blue colors. When a red color is desired, the green and blue sub-pixels are turned to the black state so that the only color displayed is red. When the black state is desired, all three-sub-pixels are turned to the black state. When the white state is desired, the three sub-pixels are turned to red, green and blue, respectively, and as a result, a white state is seen by the viewer.

The biggest disadvantage of such a technique is that since each of the sub-pixels has a reflectance of about one third of the desired white state, the white state is fairly dim. To compensate this, a fourth sub-pixel may be added which can display only the black and white states, so that the white level is doubled at the expense of the red, green or blue color level (where each sub-pixel is only one fourth of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with these approaches, the white level is normally substantially less than half of that of a black and white display, rendering it an unacceptable choice for display devices, such as e-readers or displays that need well readable black-white brightness and contrast.

SUMMARY OF THE INVENTION

A first aspect of the invention is directed to a display device comprising (a) an electrophoretic medium and having first and second surfaces on opposed sides thereof, the electrophoretic medium comprising a first type of particles, a second type of particles and a third type of particles, all dispersed in a solvent or solvent mixture, the first, second and third types of particles having respectively first, second and third optical characteristics differing from one another, the first type of particles having a charge of one polarity and the second and third types of particles having charges of the opposite polarity, and the second type of particles having an electric field threshold, and (b) a plurality of pixels wherein each pixel has three sub-pixels and two of the sub-pixels have color filters and the remaining sub-pixel has a color filter which is clear and colorless or has no color filter.

In one embodiment of this aspect of the invention, the first type of particles and the second type of particles are of the white and black colors, respectively. In one embodiment, the third type of particles is non-white and non-black. In one embodiment, the third type of particles is of a color selected from the group consisting red, green, blue, magenta, yellow and cyan.

In one embodiment, the optical characteristic is color state.

In one embodiment, the electrophoretic medium is filled in display cells and sandwiched between a common electrode and a layer of pixel electrodes. In one embodiment, the colors of the color filters are selected to be complementary to the color of the third type of particles. In one embodiment, the charge intensity of the third type of particles is less than 50% of the charge intensity of the second type of particles. In one embodiment, the charge intensity of the third type of particles is 5% to 30% of the charge intensity of the second type of particles. In one embodiment, the first type of particles is white particles, the second type of particles is black particles and the third type of particles is red particles.

Another aspect of the invention is directed to a display device comprising (a) an electrophoretic medium and having first and second surfaces on opposed sides thereof, the electrophoretic medium comprising a first type of particles, a second type of particles, a third type of particles and a fourth type of particles, all dispersed in a solvent or solvent mixture, the first, second, third and fourth types of particles having respectively first, second, third and fourth optical characteristics differing from one another, the first type of particles having a high positive charge, the second type of particles having a high negative charge, the third type of particles having a low positive charge and the fourth type of particles having a low negative charge, and (b) a plurality of pixels wherein each pixel has three sub-pixels and one of the sub-pixels has a color filter and the remaining two sub-pixels have color filters which are clear and colorless or have no color filter.

In one embodiment of this aspect of the invention, the optical characteristic is color state.

In one embodiment, the electrophoretic medium is filled in display cells and sandwiched between a common electrode and a layer of pixel electrodes.

In one embodiment, the colors of the color filters are selected to be complementary to the colors of the four types of particles. In one embodiment, the low charged particles have a charge intensity which is less than 75% of the charge intensity of the high charged particles. In one embodiment, the low positive charged particles have a charge intensity which is less than 50% of the charge intensity of the high positive charged particles and the low negative charged particles have a charge intensity which is less than 75% of the charge intensity of the high negative charged particles.

In one embodiment, the high positive charged particles are black particles, the high negative charged particles are yellow particles, the low positive charged particles are red particles and the low negative charged particles are white particles.

BRIEF DESCRIPTION OF THE FIGURES

FIGS. 6A-6C illustrate the driving sequence of the four particle fluid system.

FIG. 8 shows configuration of a display device of the present invention wherein display cells and pixel electrodes are not aligned.

DETAILED DESCRIPTION OF THE INVENTION

General:

A display fluid of the present invention may comprise three or four types of particles. The multiple types of particles may be of any colors as long as the colors are visually distinguishable. In the fluid, the particles are dispersed in a solvent or solvent mixture.

For white particles, they may be formed from an inorganic pigment, such as $TiO_2$, $ZrO_2$, ZnO, $Al_2O_3$, $Sb_2O_3$, $BaSO_4$, $PbSO_4$ or the like.

For black particles, they may be formed from CI pigment black 26 or 28 or the like (e.g., manganese ferrite black spinel or copper chromite black spinel) or carbon black.

The colored particles (non-white and non-black) may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 and PY20. These are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

In addition to the colors, the multiple types of particles may have other distinct optical characteristics, such as optical transmission, reflectance, luminescence or, in the case of displays intended for machine reading, pseudo-color in the sense of a change in reflectance of electromagnetic wavelengths outside the visible range.

Figure 1:
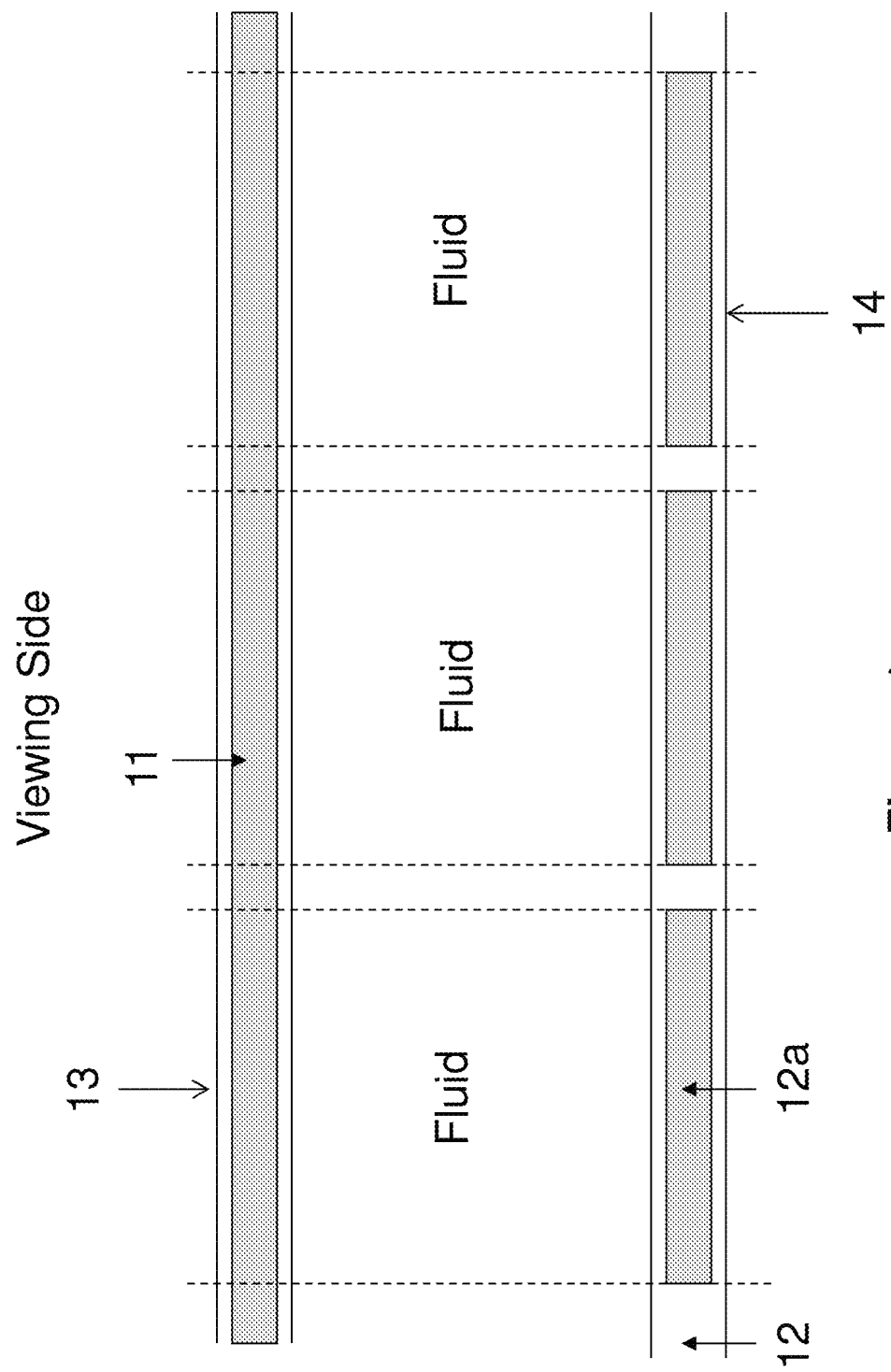
FIG. 1 depicts a display layer of the present invention.

A display layer utilizing a display fluid of the present invention, as shown in FIG. 1, has two surfaces, a first surface (13) on the viewing side and a second surface (14) on the opposite side of the first surface (13). The display fluid is sandwiched between the two surfaces. On the side of the first surface (13), there is a common electrode (11) which is a transparent electrode layer (e.g., ITO), spreading over the entire top of the display layer. On the side of the second surface (14), there is an electrode layer (12) which comprises a plurality of pixel electrodes (12a).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in FIG. 1 denotes a pixel. As shown, each pixel has a corresponding pixel electrode. An electric field is created for a pixel by the potential difference between a voltage applied to the common electrode and a voltage applied to the corresponding pixel electrode.

The multiple types of particles may have different charge levels. In one embodiment, the weaker charged particles have charge intensity being less than about 50%, preferably about 5% to about 30%, the charge intensity of the stronger charged particles. In another embodiment, the weaker charged particles have charge intensity being less than about 75%, or about 15% to about 55%, the charge intensity of the stronger charged particles. In a further embodiment, the comparison of the charge levels as indicated applies to two types of particles having the same charge polarity.

The charge intensity may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge-control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

If there are two pairs of high-low charge particles in the same fluid, the two pair may have different levels of charge differentials. For example, in one pair, the low positively charged particles may have a charge intensity which is 30% of the charge intensity of the high positively charged particles and in another pair, the low negatively charged particles may have a charge intensity which is 50% of the charge intensity of the high negatively charged particles.

The solvent in which the multiple types of particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

In the present invention, at least one type of particles may demonstrate an electric field threshold. In one embodiment, one type of the higher charged particles has an electric field threshold.

The term "electric field threshold", in the context of the present invention, is defined as the maximum electric field that may be applied for a period of time (typically not longer than 30 seconds, preferably not longer than 15 seconds), to a group of particles, without causing the particles to appear at the viewing side of a pixel, when the pixel is driven from a color state different from the color state of the group of particles. The term "viewing side", in the present application, refers to the first surface in a display layer where images are seen by the viewers.

The electric field threshold is either an inherent characteristic of the charged particles or an additive-induced property.

In the former case, the electric field threshold is generated, relying on certain attraction force between oppositely charged particles or between particles and certain substrate surfaces.

In the case of additive-induced electric field threshold, a threshold agent which induces or enhances the threshold characteristics of an electrophoretic fluid may be added. The threshold agent may be any material which is soluble or dispersible in the solvent or solvent mixture of the electrophoretic fluid and carries or induces a charge opposite to that of the charged particles. The threshold agent may be sensitive or insensitive to the change of applied voltage. The term "threshold agent" may broadly include dyes or pigments, electrolytes or polyelectrolytes, polymers, oligomers, surfactants, charge controlling agents and the like.

Figure 2:
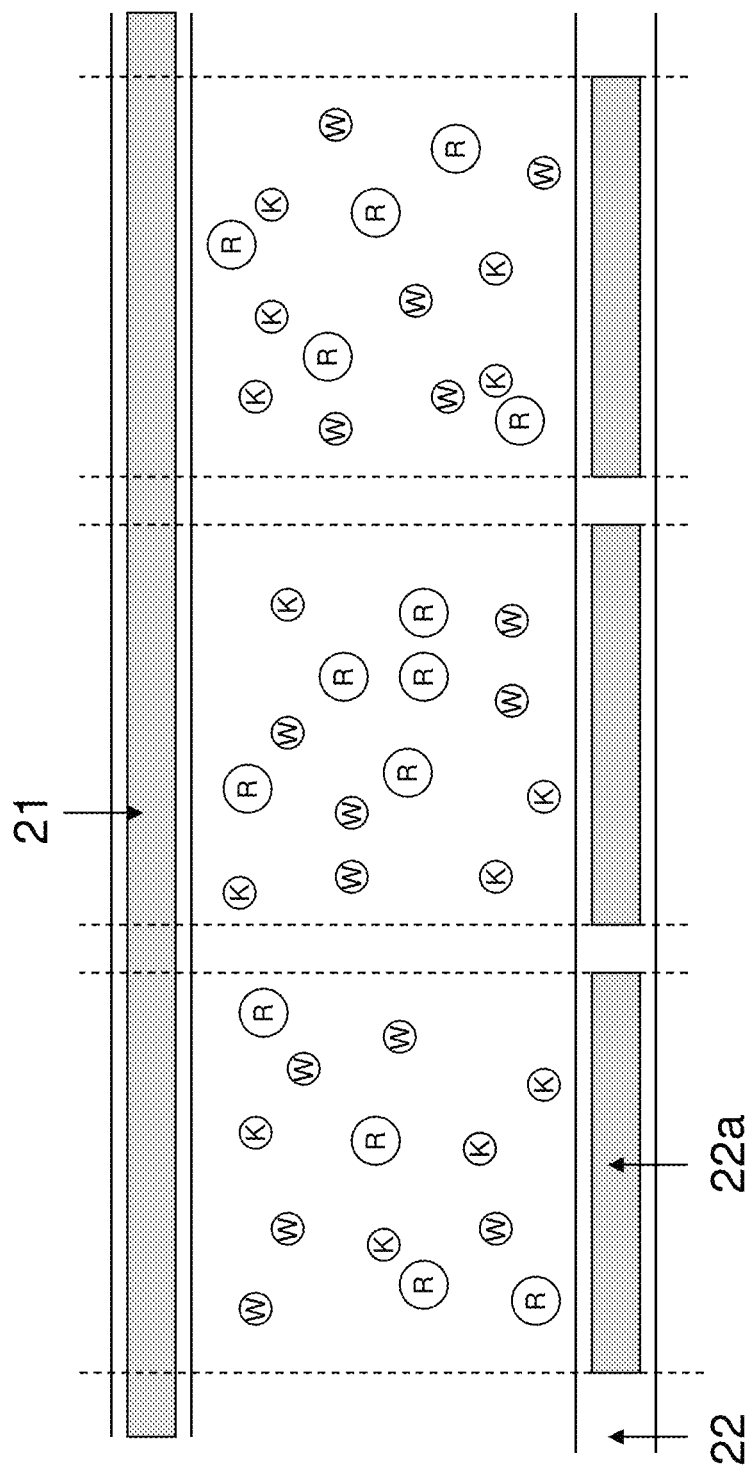
FIG. 2 depicts an electrophoretic fluid comprising three types of particles.

Three Particle System:

FIG. 2 depicts a three particle fluid system as described in US2014-0092466; the content of which is incorporated herein by reference in its entirety.

The electrophoretic fluid comprises three types of particles dispersed in a dielectric solvent or solvent mixture. For ease of illustration, the three types of particles may be referred to as a first type of particles, a second type of particles and a third type of particles. As an example shown in FIG. 2, the first type of particles is white particles (W); the second type of particles is black particles (K); and the third type of particles is red particles (R). The third type of particles can be any colors of non-white and non-black.

Two of the three types of particles (i.e., the first and second types of particles) have opposite charge polarities and the third type of particles carries the same charge polarity as one of the other two types of particles. For example, if the black particles are positively charged and the white particles are negatively charged, and then the red particles are either positively charged or negatively charged.

EXAMPLE 1(a)

FIG. 3 demonstrates the driving sequence of this type of color display device. For illustration purpose, the white particles (W) are negatively charged while the black particles (K) are positively charged. The red particles (R) carry the same charge polarity as the black particles (K).

Because of the attraction force between the black and white particles, the black particles (K) are assumed to have an electric field threshold of 1V. Therefore, the black particles would not move to the viewing side if an applied voltage potential difference is 1V or lower.

The red particles carry a charge weaker than that of the black particles. As a result, the black particles move faster than the red particles (R), when an applied voltage potential is higher than 1V because of the stronger charge carried by the black particles.

Figure 3A:
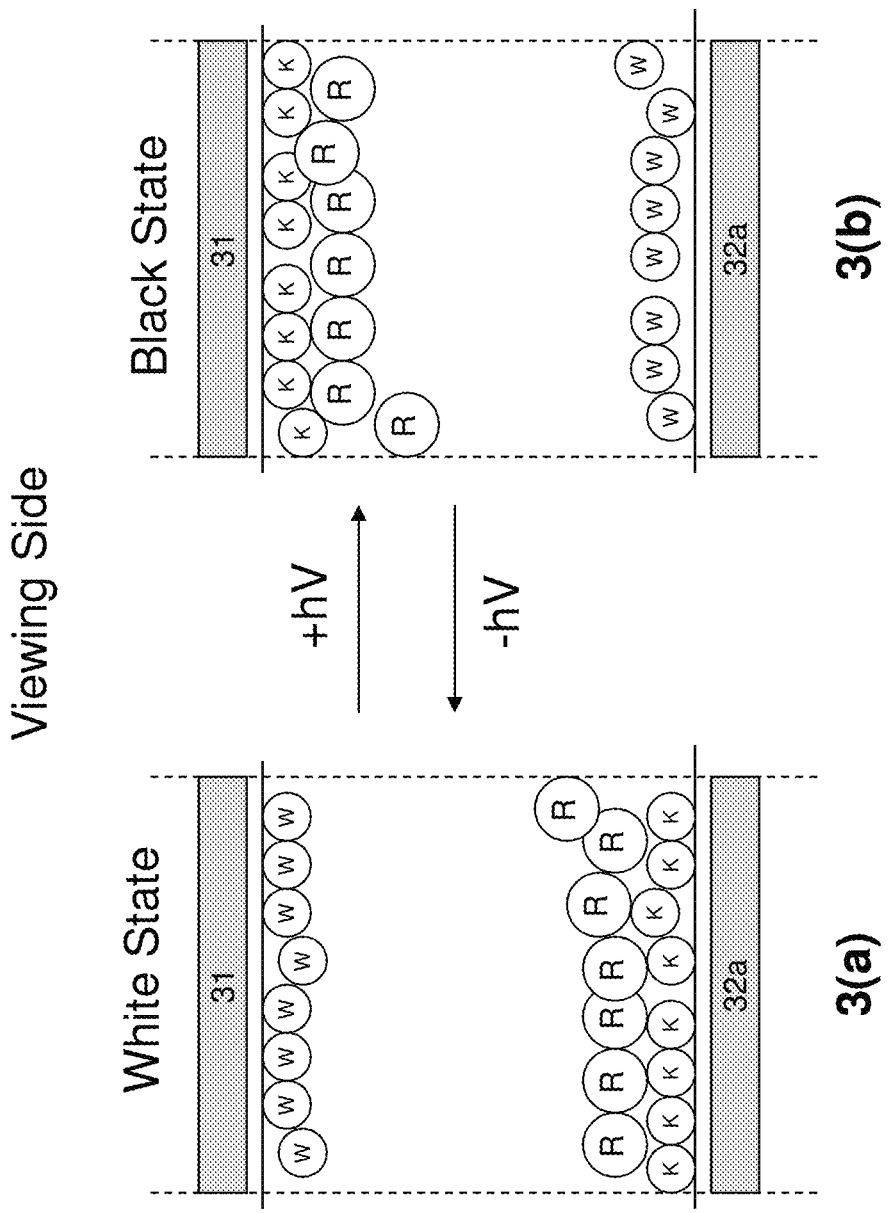
FIGS. 3A-3B illustrate the driving sequence of the three particle fluid system.

In FIG. 3A, a high positive voltage potential difference, +hV, is applied. In this case, the white particles (W) move to be near or at the pixel electrode (32a) and the black particles (K) and the red particles (R) move to be near or at the common electrode (31). As a result, a black color is seen at the viewing side. The red particles (R) move towards the common electrode (31); however because they carry lower charge, they move slower than the black particles (K).

Figure 3B:
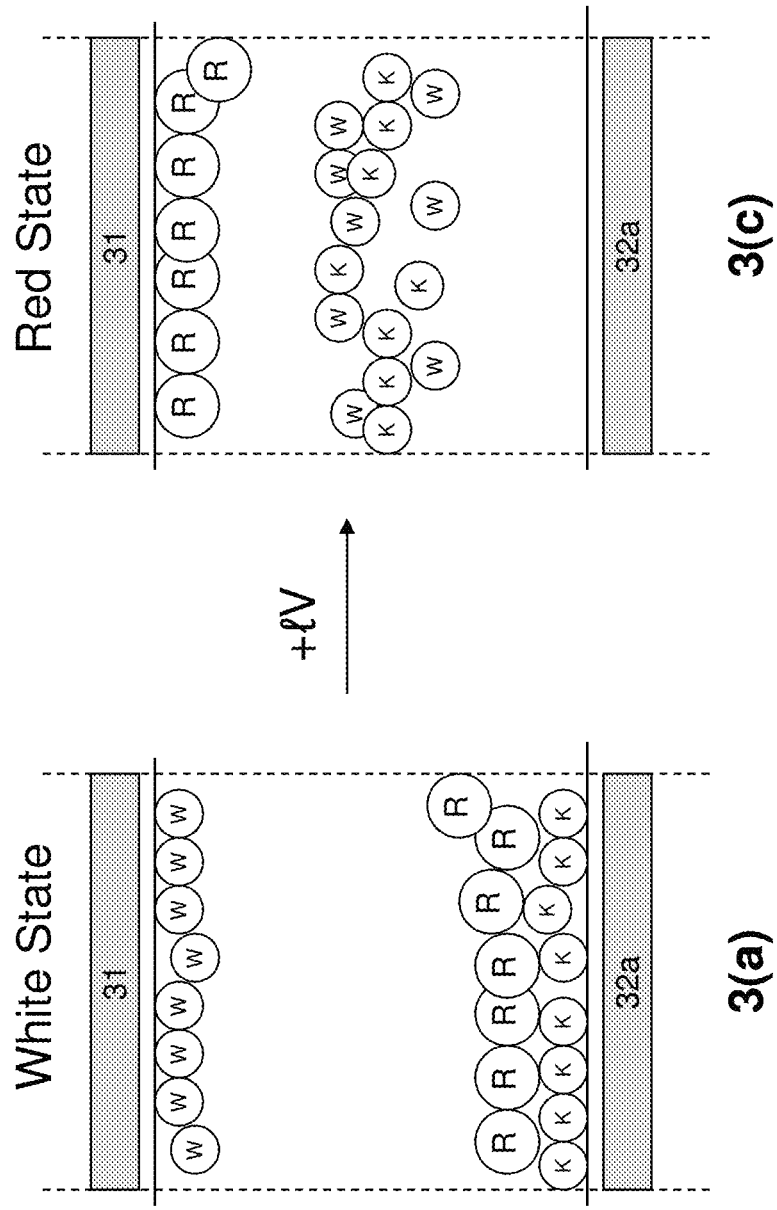

In FIG. 3B, when a high negative potential difference, −hV, is applied, the white particles (W) move to be near or at the common electrode (31) and the black particles (K) and the red particles (R) move to be near or at the pixel electrode (32a). As a result, a white color is seen at the viewing side. The red particles (R) move towards the pixel electrode because they are also positively charged. However, because of their lower charge intensity, they move slower than the black particles.

In FIG. 3C, a low positive voltage potential difference, +1V, is applied to the pixel of FIG. 3A (i.e., driving from the white color state). In this case, the negatively charged white particles (W) in FIG. 3A move towards the pixel electrode (32a). The black particles (K) move little because of their electric field threshold being 1v. Due to the fact that the red particles (R) do not have a significant electric field threshold, they move to be near or at the common electrode (31) and as a result, a red color is seen at the viewing side.

It is noted that the lower voltage (+1V or −1V) applied usually has a magnitude of about 5% to about 50% of the magnitude of the full driving voltage required to drive the pixel from the black state to the white state (−hV) or from the white state to the black state (+hV). In one embodiment, +hV and −hV may be +15V and −15V, respectively and +1V and −1V may be +3V and −3V, respectively. In addition, it is noted that the magnitudes of +hV and −hV may be the same or different. Likewise, the magnitude of +1V and −1V may be the same or different.

EXAMPLE 1(b)

This example demonstrates one aspect of the present invention in which color filters are utilized.

The space between the dotted vertical lines denotes a sub-pixel, as shown in FIGS. 4A-4E. Each pixel consists of three sub-pixels (40a, 40b & 40c). Each sub-pixel therefore has a corresponding pixel electrode (42a, 42b and 42c, respectively).

The display fluid in this example is the same as that in Example 1(a).

Two of the sub-pixels (40a and 40b) have color filters (B and G respectively) on the viewing side. The remaining sub-pixel (40c) may have a color filter which is clear and colorless on the viewing side or may have no color filter.

The colors of the color filters are selected to be complementary to the color of the color particles, according to the additive/subtractive color system. For example, if the color particles are red, then the two color filters may be blue and green, respectively.

The figures show how five different color states may be displayed by a pixel. Sub-pixel 40a has a blue color filter (B) and sub-pixel 40b has a green color filter (G). Sub-pixel 40c has either a clear and colorless filter or no filter.

Figure 4A:
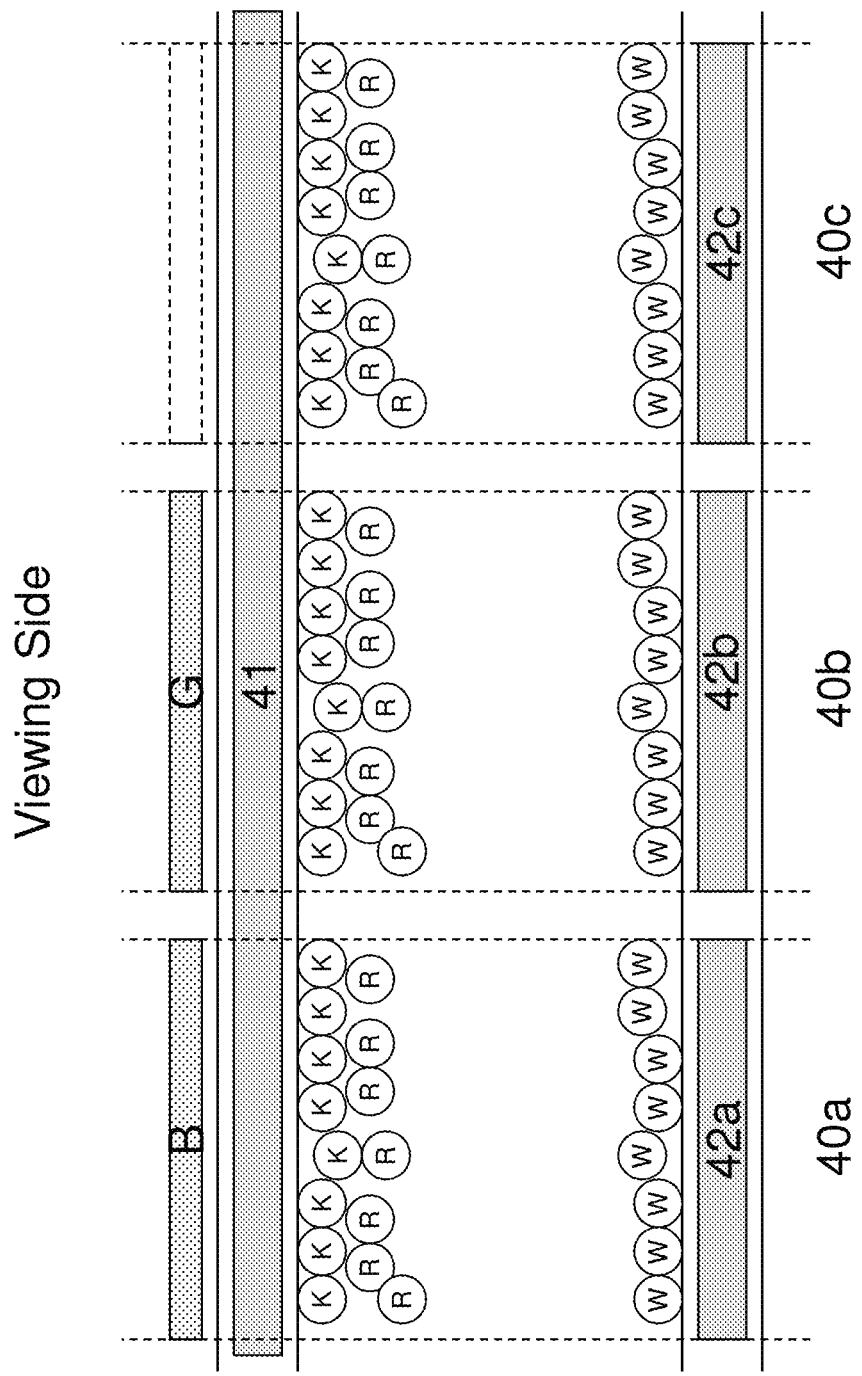
FIGS. 4A-4E show an example of the present invention, with color filters.

In FIG. 4A, all of the sub-pixels are driven to the black state (as demonstrated in FIG. 3B. In this case, the pixel is seen in the black state.

Figure 4B:
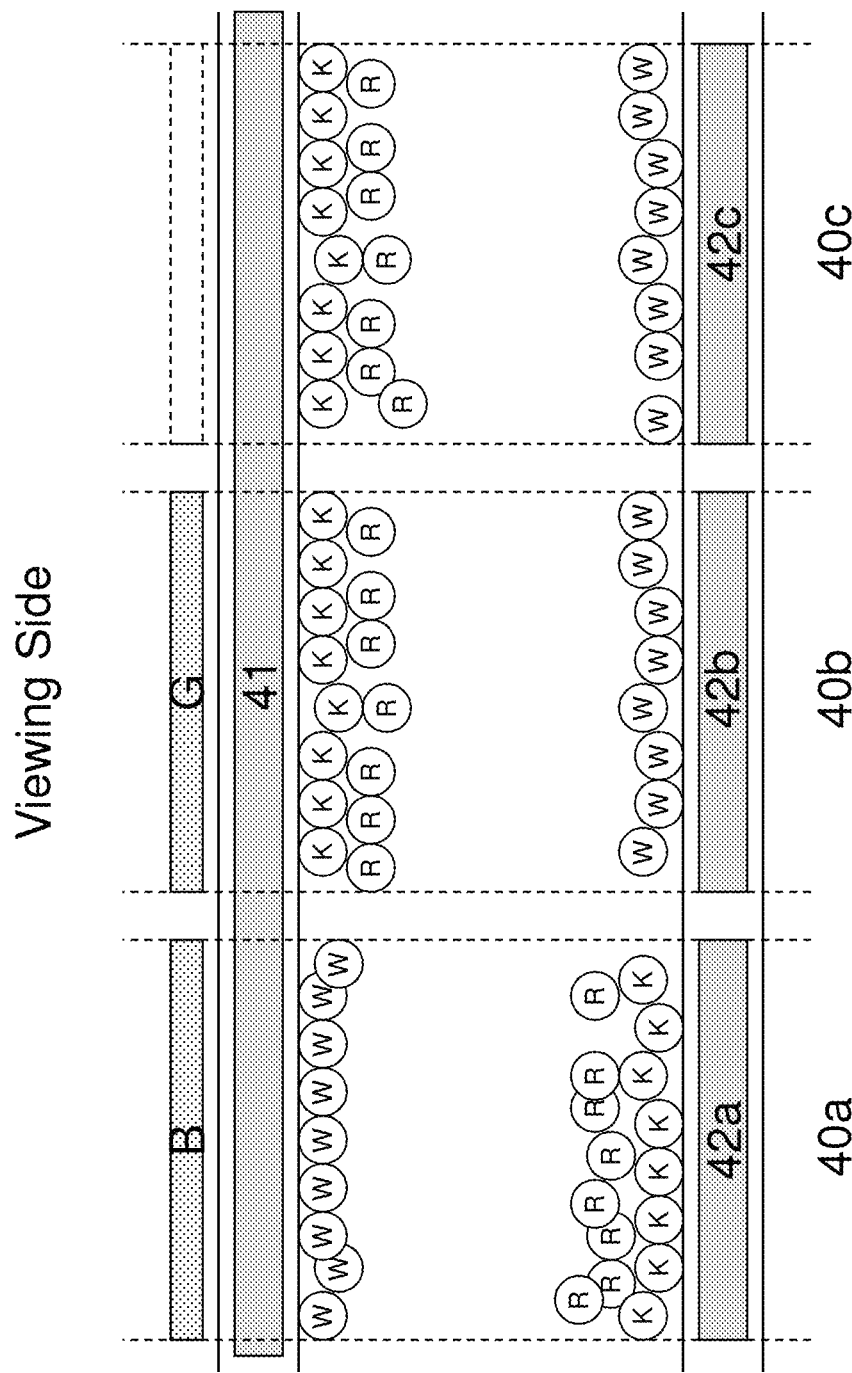

In FIG. 4B, sub-pixel 40a is driven to the white state (as demonstrated in FIG. 3A) and sub-pixels 40b and 40c are driven to the black state. In this case, the pixel is seen in the blue state. The blue color state may also be achieved by driving sub-pixel 40*b* to the black state and sub-pixel 40*c* to the white state; but the resulting blue color in this case would not be as saturated.

Figure 4C:
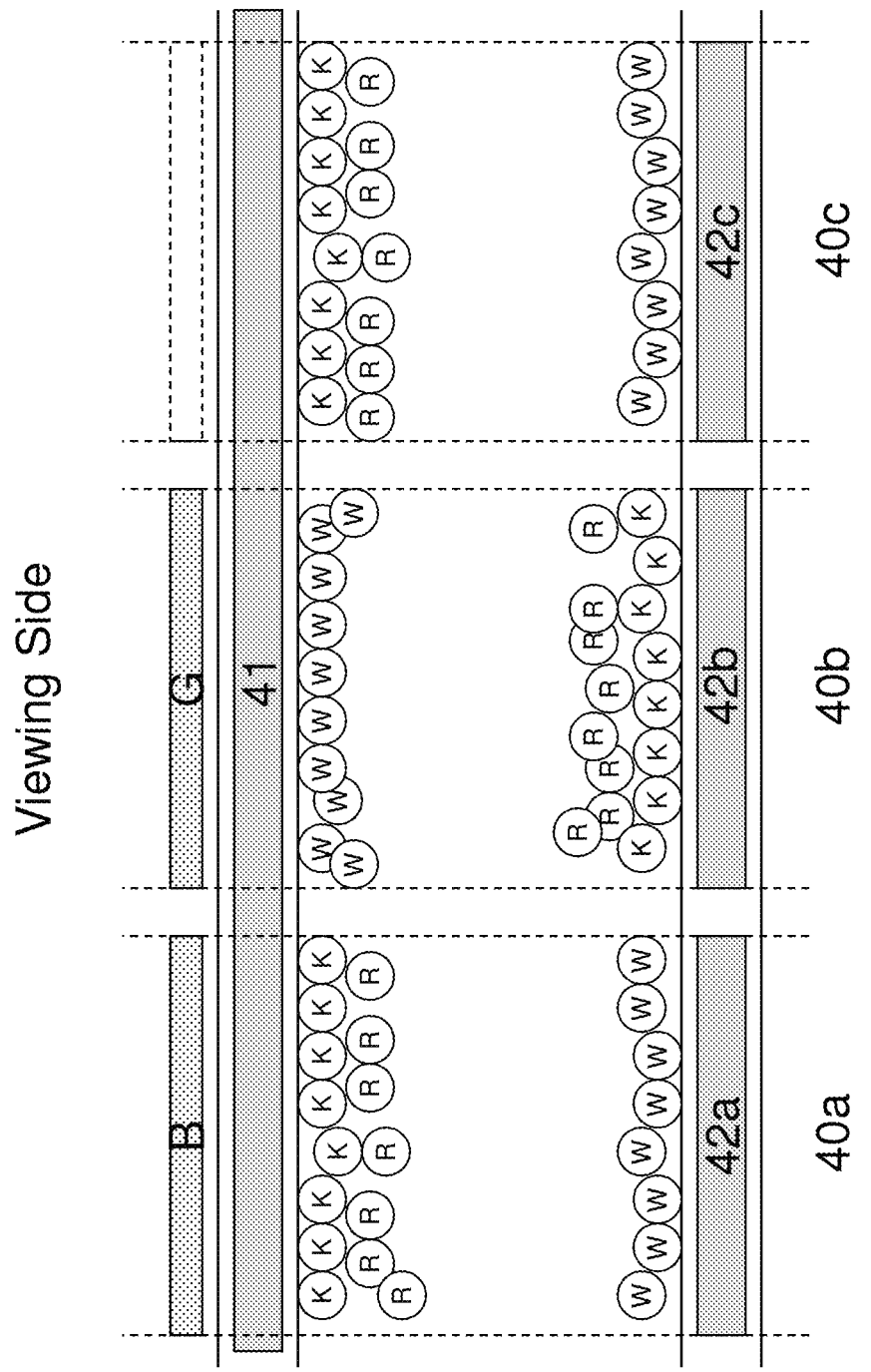

In FIG. 4C, sub-pixel 40*b* is driven to the white state and sub-pixels 40*a* and 40*c* are driven to the black state. In this case, the pixel is seen in the green state. The green color state may also be achieved by driving sub-pixel 40*a* to the black state and sub-pixel 40*c* to the white state; but the resulting green color would appear to be lighter and less saturated.

Figure 4D:
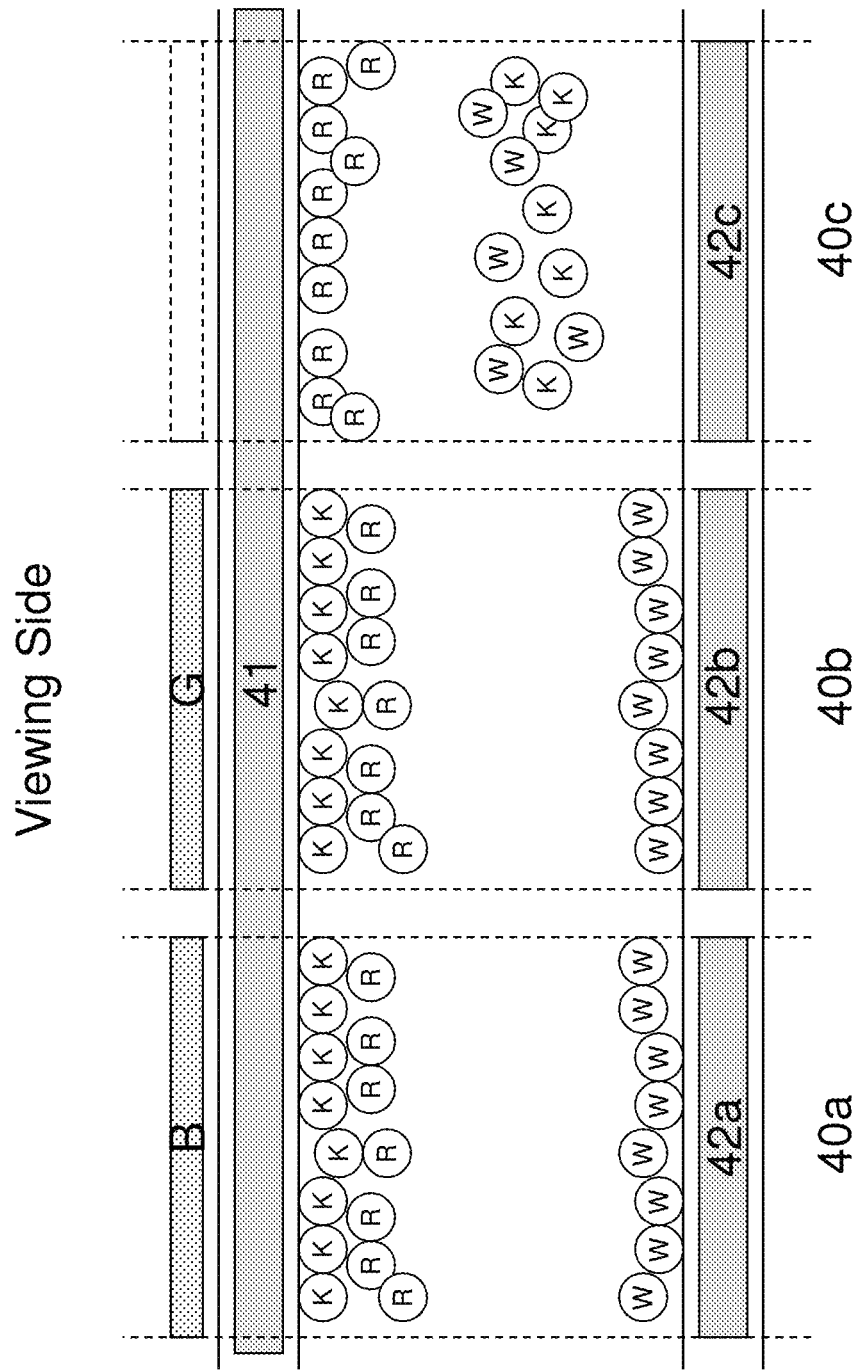

In FIG. 4D, both sub-pixels 40*a* and 40*b* are driven to the black state and sub-pixel 40*c* is driven to the red state (as demonstrated in FIG. 3C). The pixel would be seen in the red state.

Figure 4E:
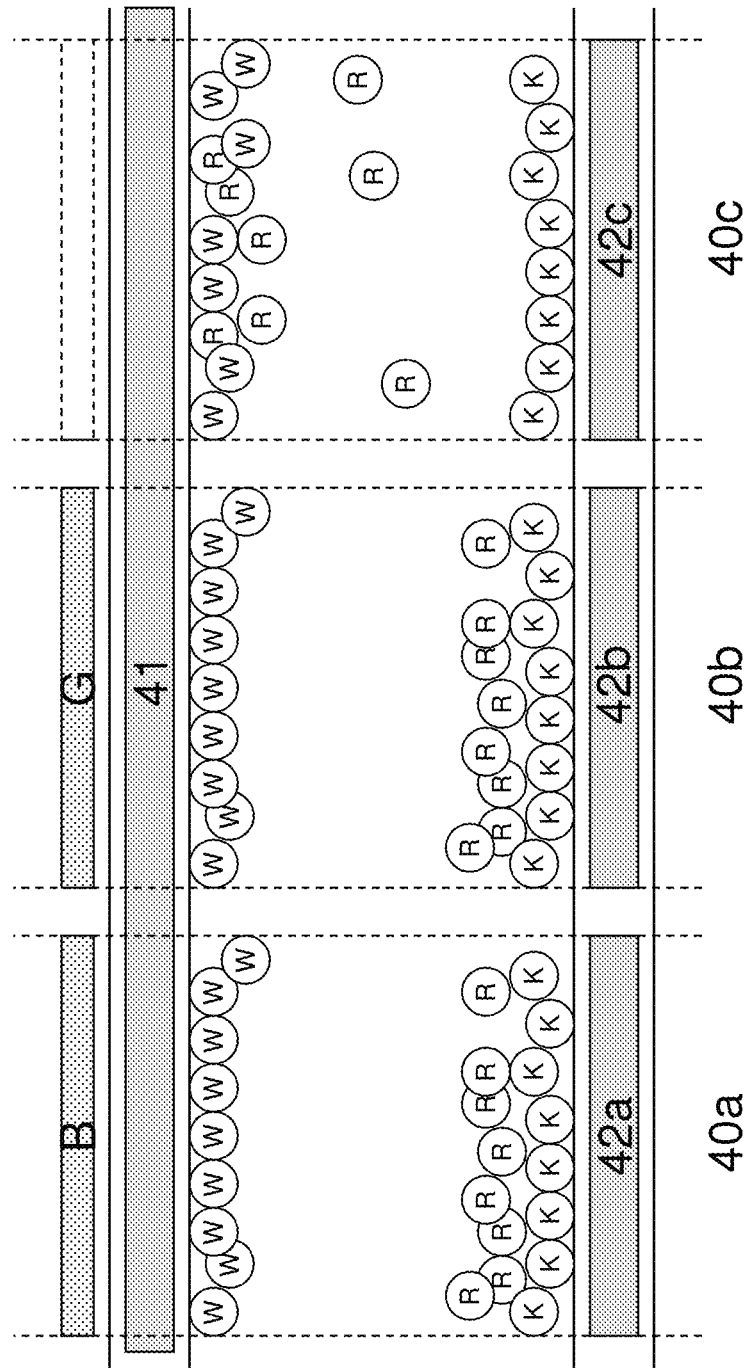

In FIG. 4E, both sub-pixels 40*a* and 40*b* are driven to the white state and sub-pixel 40*c* is driven to a state as shown. The state as shown for sub-pixel 40*c* may be achieved by first driving the sub-pixel to the red state and then to the white state, with properly adjusted pulsing time and/or voltage intensity.

The clear and colorless filter, if present, may have a larger area than the blue and green filters. In addition, the red particles scattered among the white particles in sub-pixel 40*c* can provide better optical efficiency with the blue and green colors of sub-pixels 40*a* and 40*b*. As a result of these two factors, the white color state achieved for the pixel is of high quality.

As shown in this example, each pixel can display five color states, white, black, red, green and blue.

Figure 5:
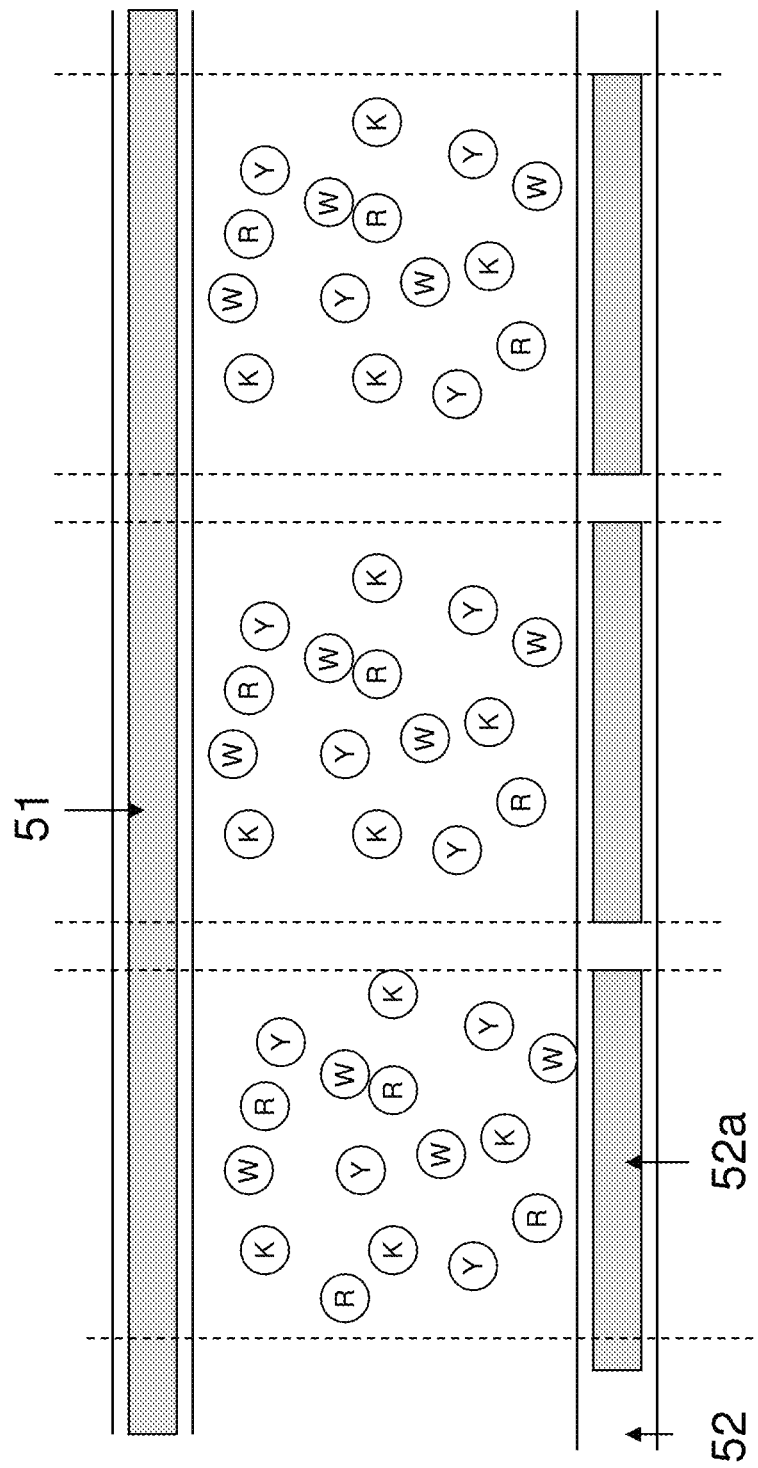
FIG. 5 depicts an electrophoretic fluid comprising four types of particles.

Four Particle System:

FIG. 5 depicts an alternative display device in which the electrophoretic fluid comprises four types of particles dispersed in a dielectric solvent or solvent mixture, as described in U.S. Provisional Application No. 61/824,887, which is incorporated herein by reference in its entirety. For ease of illustration, the four types of particles may be referred to as a first type of particles, a second type of particles, a third type of particles and a fourth type of particles. As an example shown in FIG. 5, the first type of particles is black particles (K); the second type of particles is yellow particles (Y); the third type of particles is red particles (R); and the fourth type of particles is white particles (W).

EXAMPLE 2(a)

In this example, the black and yellow particles carry opposite charge polarities. For example, if the black particles are positively charged, the yellow particles are negatively charged. The red and white particles are also oppositely charged. However the charges carried by the black and yellow particles are stronger than the charges carried by the red and white particles.

For example, the black particles (K) carry a high positive charge; the yellow particles (Y) carry a high negative charge; the red (R) particles carry a low positive charge; and the white particles (W) carry a low negative charge. The driving sequence of this type of color display device is shown in FIG. 6.

Figure 6A:
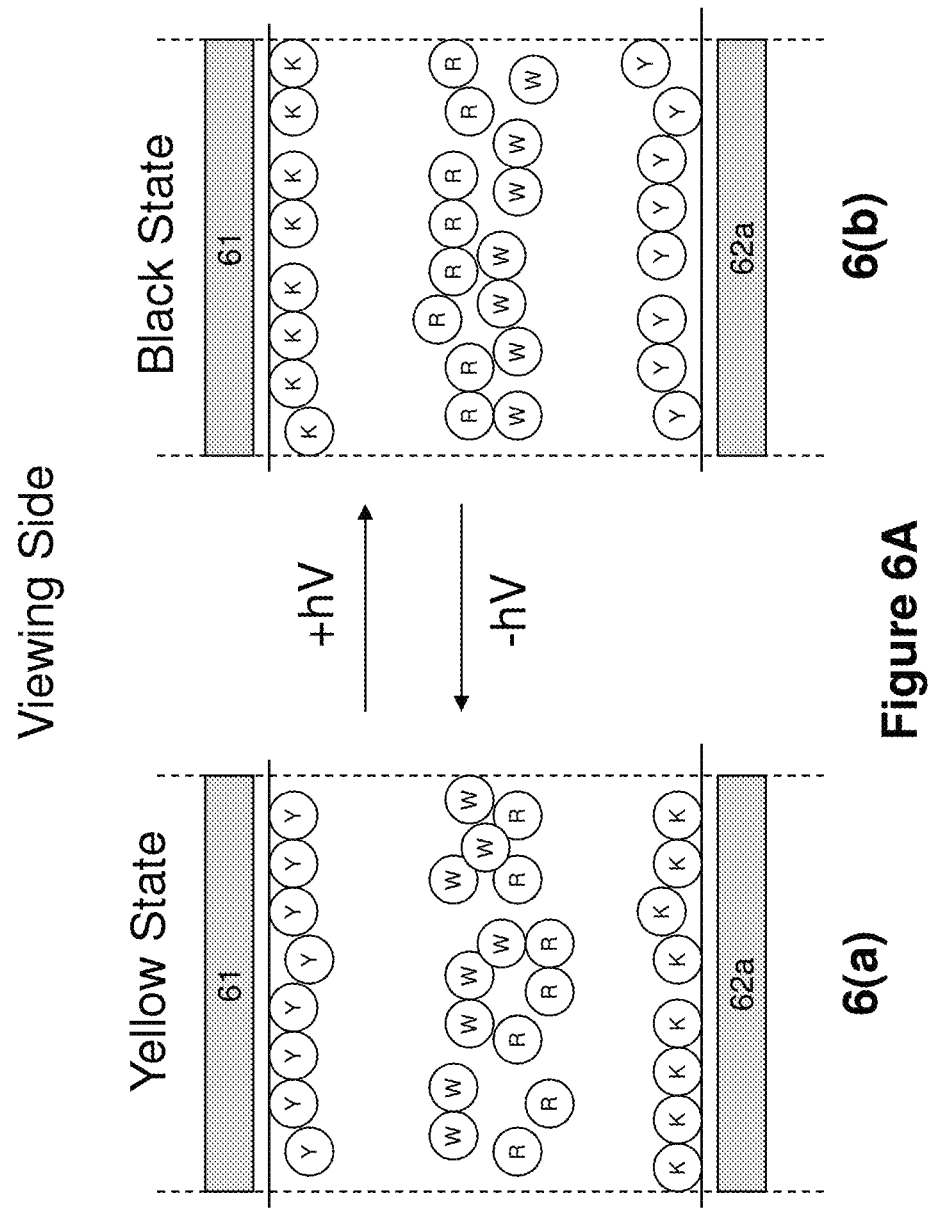

In FIG. 6A, when a high negative voltage potential difference (e.g., −hV) is applied to a pixel, the yellow particles (Y) are pushed to the common electrode (61) side and the black particles (K) are pulled to the pixel electrode (62*a*) side. The red(R) and white (W) particles, due to their lower charge levels, move slower than the higher charged black and yellow particles and therefore they stay between the common electrode and the pixel electrode, with white particles above the red particles. As a result, a yellow color is seen at the viewing side.

In FIG. 6B, when a high positive voltage potential difference (e.g., +hV) is applied to the pixel, the particle distribution would be opposite of that shown in FIG. 6*a* and as a result, a black color is seen at the viewing side.

Figure 6C:
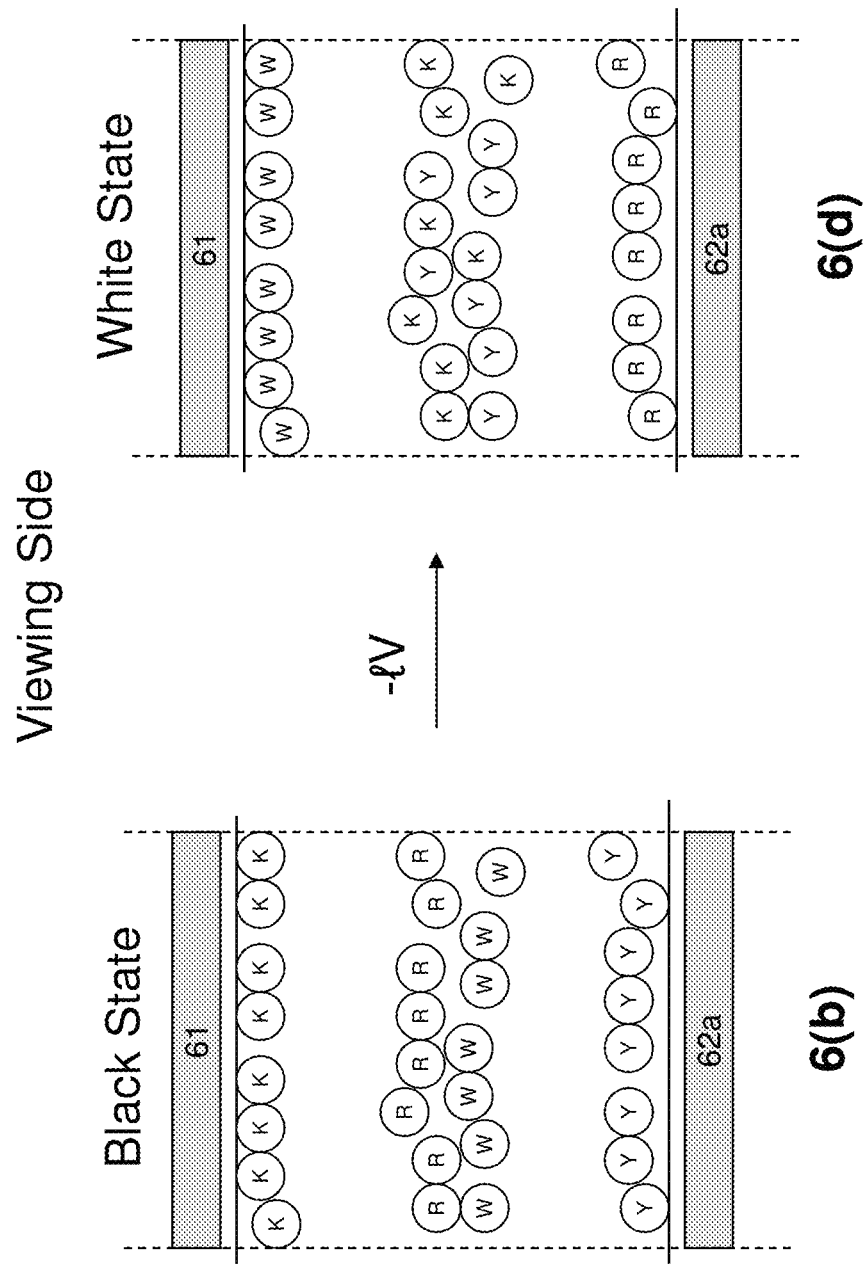

In FIG. 6C, when a lower positive voltage potential difference (e.g., +lV) is applied to the pixel of FIG. 6A (that is, driven from the yellow state), the yellow particles (Y) move towards the pixel electrode (62*a*) while the black particles (K) move towards the common electrode (61). However, when they meet while moving, because of their strong attraction to each other, they stop moving and remain between the common electrode and the pixel electrode. The lower charged (positive) red particles (R) move all the way towards the common electrode (61) side (i.e., the viewing side) and the lower charged (negative) white particles (W) move towards the pixel electrode (62*a*) side. As a result, a red color is seen.

In FIG. 6D, when a lower negative voltage potential difference (e.g., −lV) is applied to the pixel of FIG. 6B (that is, driven from the black state), the black particles (K) move towards the pixel electrode (62*a*) while the yellow particles (Y) move towards the common electrode (61). When the black and yellow particles meet, because of their strong attraction to each other, they stop moving and remain between the common electrode and the pixel electrode. The lower charged (negative) white particles (W) move all the way towards the common electrode side (i.e., the viewing side) and the lower charged (positive) red particles (R) move towards the pixel electrode side. As a result, a white color is seen.

It is also noted that in FIGS. 6C and 6D, while the low driving voltages applied (+lV or −lV) are not sufficient to separate the stronger charged black and yellow particles, they, however, are sufficient to separate, not only the two types of oppositely charged particles of lower charge intensity, but also the lower charged particles from the stronger charged particles of opposite charge polarity.

It is noted that the lower voltage (+lV or −lV) applied usually has a magnitude of about 5% to about 50% of the magnitude of the full driving voltage required to drive the pixel from the black state to the yellow state (−hV) or from the yellow state to the black state (+hV). In one embodiment, +hV and −hV may be +15V and −15V, respectively and +lV and −lV may be +3V and −3V, respectively. In addition, it is noted that the magnitudes of +hV and −hV may be the same or different. Likewise, the magnitude of +lV and −lV may be the same or different.

EXAMPLE 2(b)

This example demonstrates the alternative aspect of the present invention in which color filters are utilized.

As shown in FIG. 7A-7E, the space between the dotted vertical lines denotes a sub-pixel. Each pixel consists of three sub-pixels (70*a*, 70*b* & 70*c*). Each sub-pixel therefore has a corresponding pixel electrode.

The display fluid in this example is the same as that in Example 2(a).

One of the sub-pixels (70*a*) has a color filter (B) on the viewing side. The remaining sub-pixels (70*b* and 70*c*) may have color filters which are clear and colorless on the viewing side or may have no color filters.

The color of the color filter is selected to be complementary to the colors of the two types of color particles (Y and R in this example), according to the additive/subtractive color system.

Figure 7A:
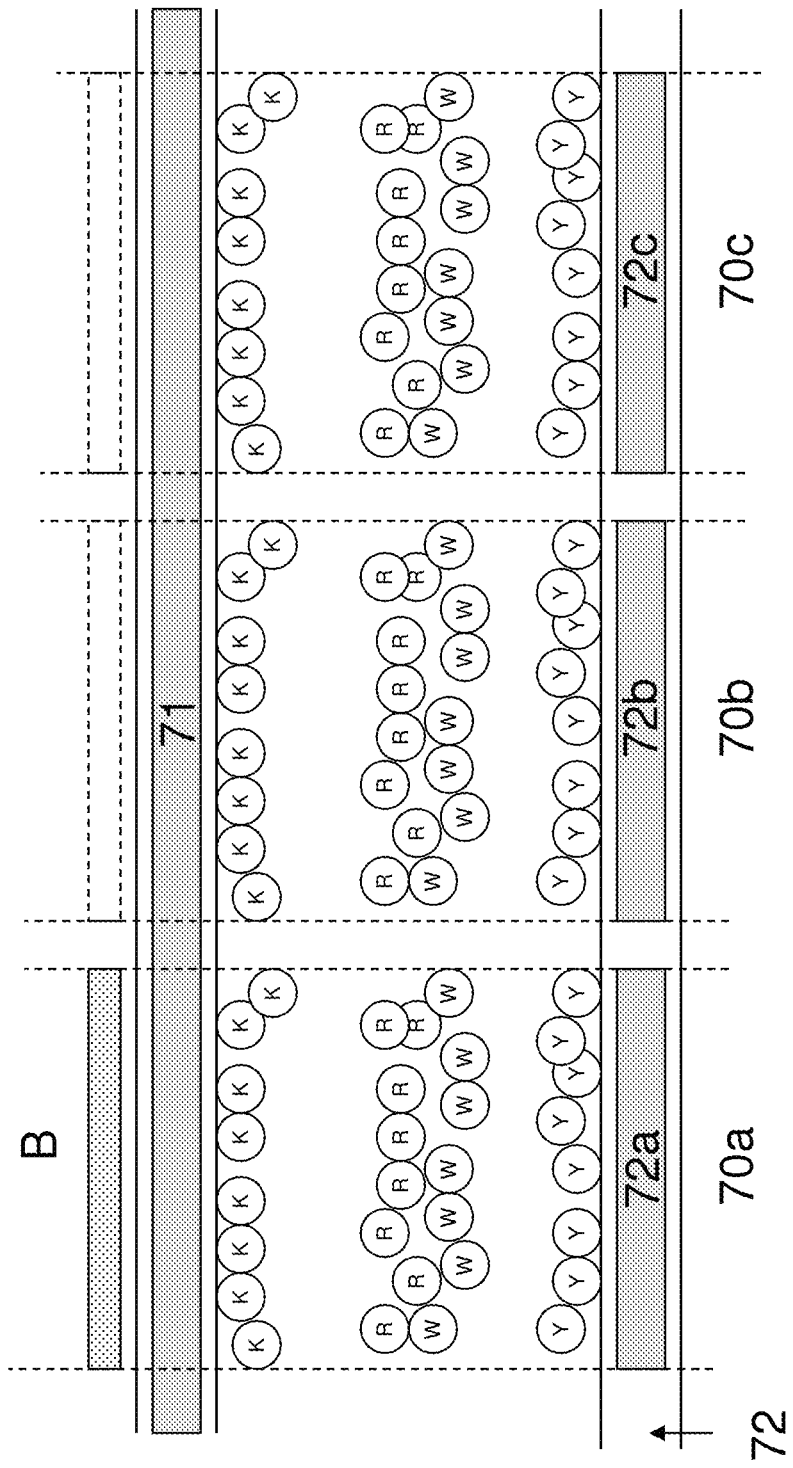
FIGS. 7A-7E show another example of the present invention, with color filters.

In FIG. 7A, all of the sub-pixels are driven to the black state (as demonstrated in FIG. 6B. In this case, the pixel is seen in the black state.

Figure 7B:
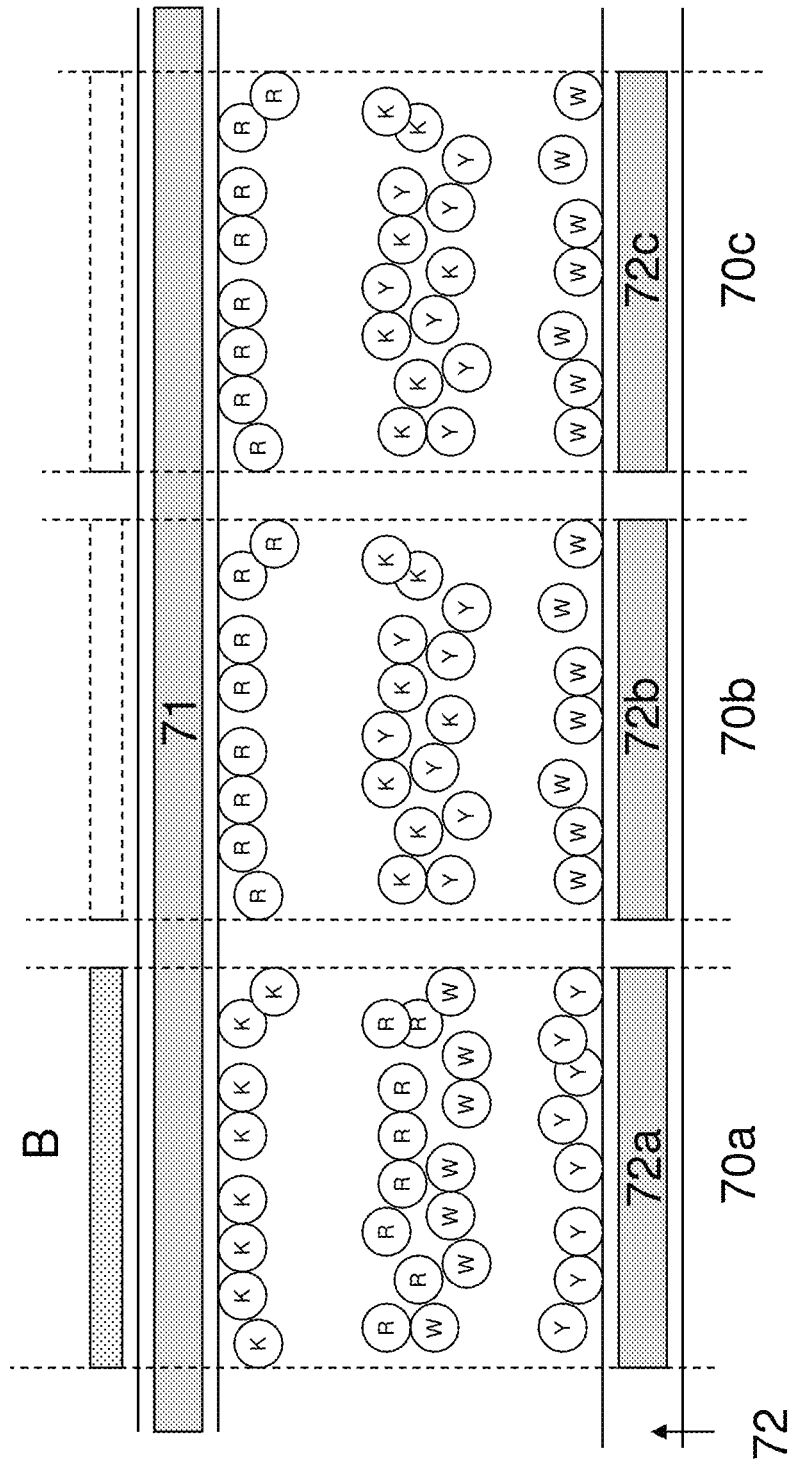

In FIG. 7B, sub-pixel 70*a* is driven to the black state and sub-pixels 70*b* and 70*c* are driven to the red state (as shown in FIG. 6C). In this case, the pixel is seen in the red state.

Figure 7C:
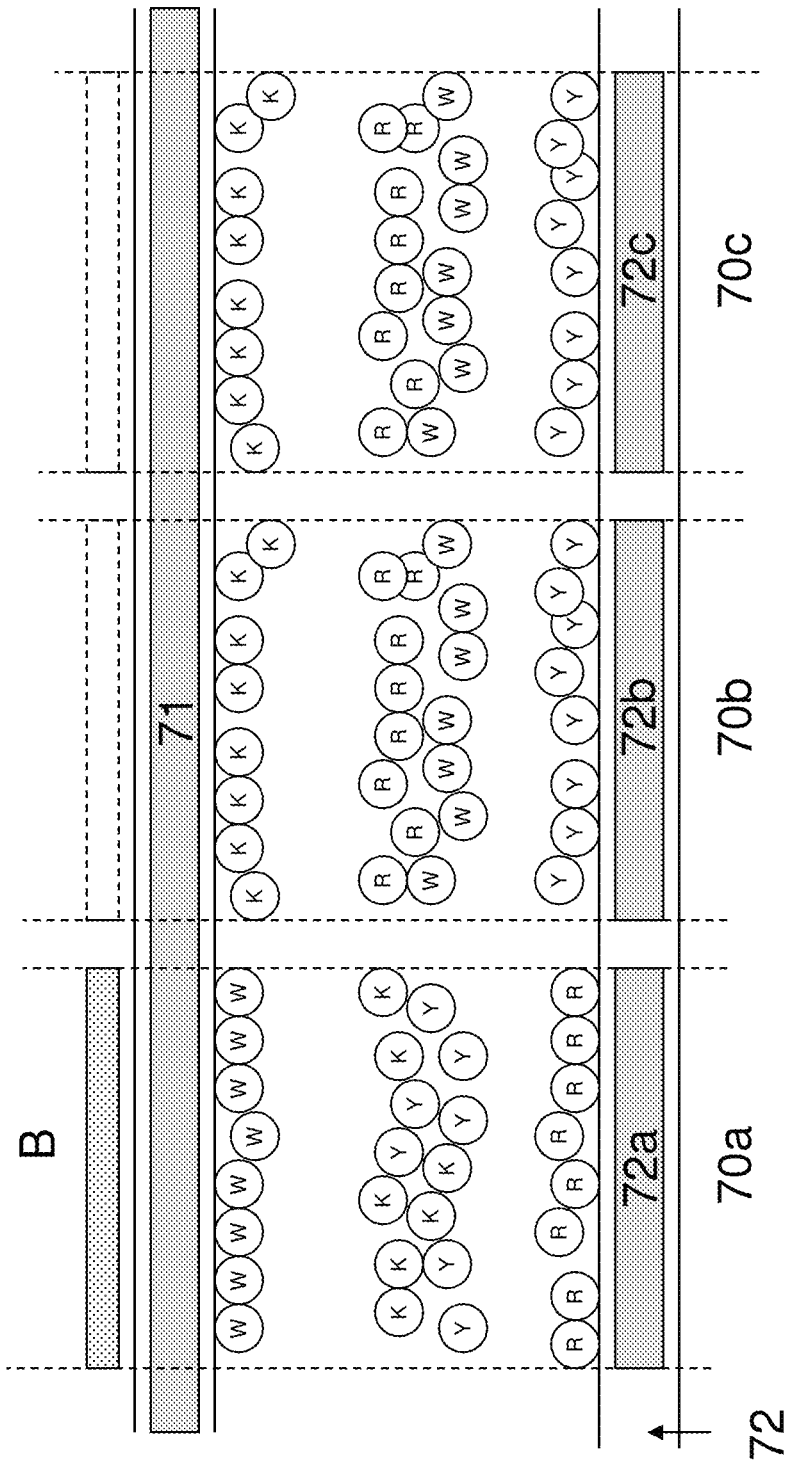

In FIG. 7C, sub-pixel 70*a* is driven to the white state (as demonstrated in FIG. 6D) and sub-pixels 70*b* and 70*c* are driven to the black state. In this case, the pixel is seen in the blue state. It is also possible to have both sub-pixels 70*b* and 70*c* driven to the white state or one to the white state and the other to the black state; but the resulting blue color would appear to be light and less saturated.

Figure 7D:
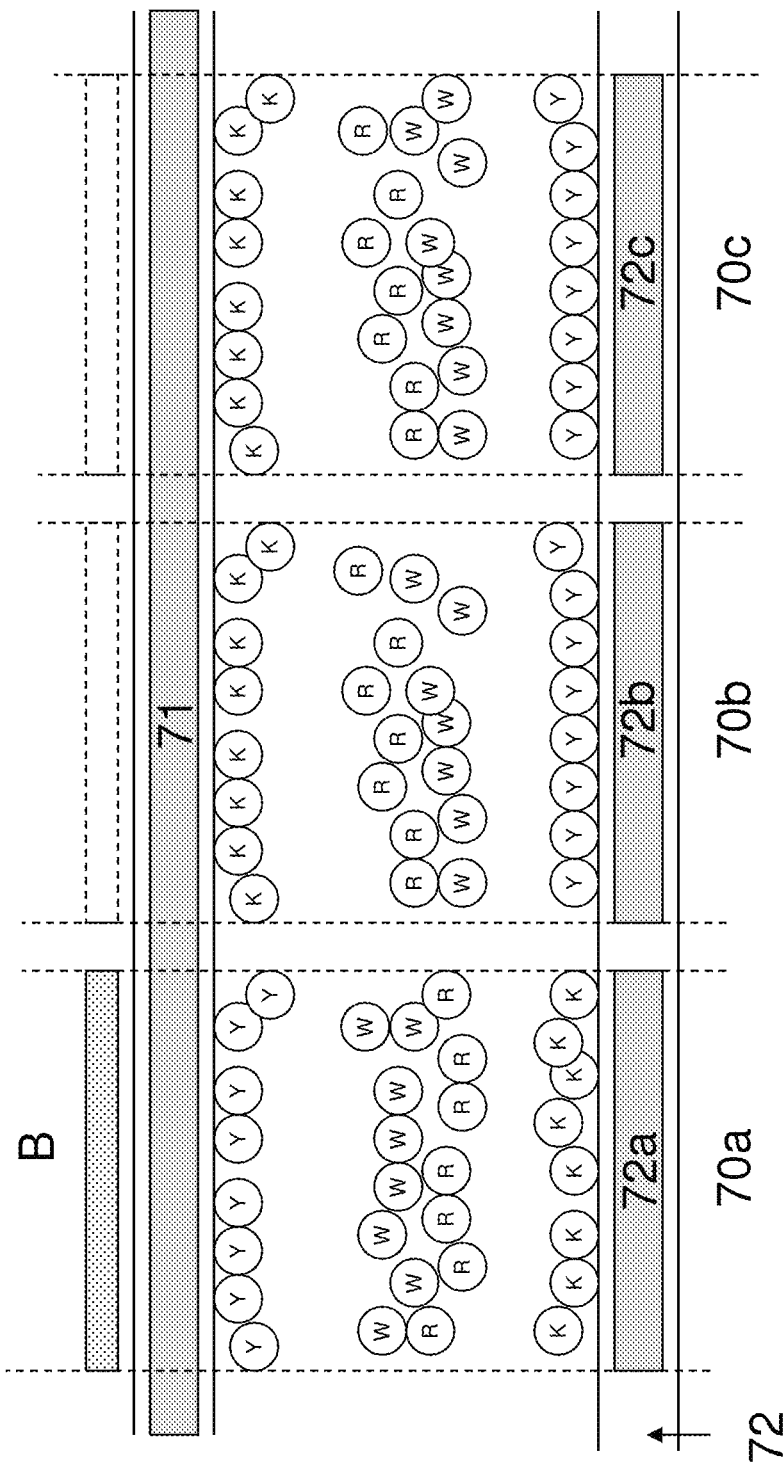

In FIG. 7D, sub-pixel 70*a* is driven to the yellow state (see FIG. 6A) and sub-pixel 70*b* and 70*c* are driven to the black state (as demonstrated in FIG. 6B). The pixel would be seen in the green state. It is also possible to have both sub-pixels 70*b* and 70*c* driven to the white state or one to the white state and the other to the black state; but the resulting green color would not be as saturated.

Figure 7E:
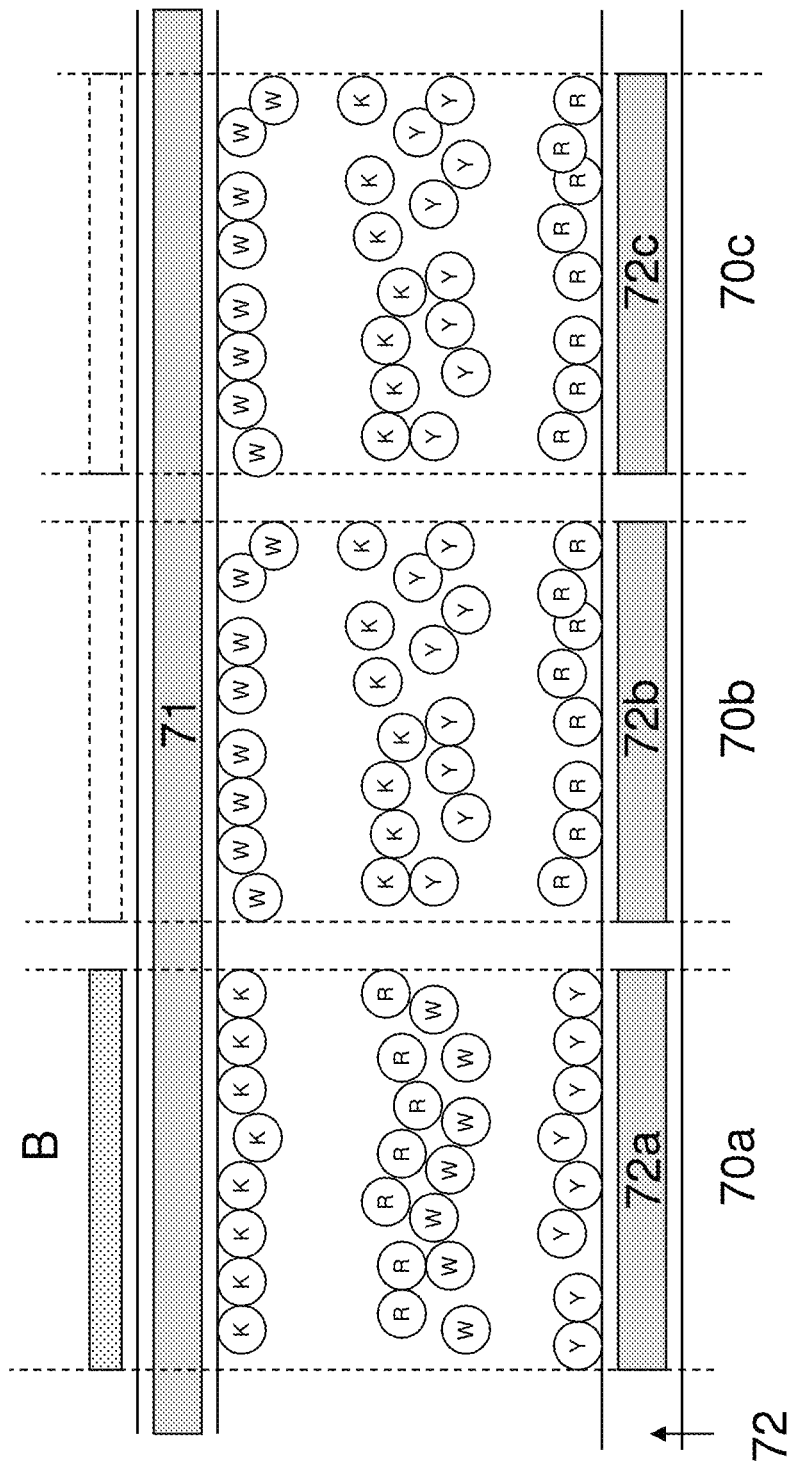

In FIG. 7E, sub-pixel 70*a* is driven to the black state and sub-pixels 70*b* and 70*c* are driven to the white state. As a result, a white color is seen. There are other options which may cause a pixel to display a white color state. For example, the white color state may also be achieved by driving sub-pixel 70*a* to the white state and one of sub-pixels 70*b* and 70*c* to the yellow state and the other to the white state.

As shown in this example, each pixel can display five color states, white, black, red, green and blue.

The electrophoretic fluid of the present invention is filled in display cells. The display cells may be microcups as described in U.S. Pat. No. 6,930,818, the content of which is incorporated herein by reference in its entirety. The display cells may also be other types of micro-containers, such as microcapsules, microchannels or equivalents, regardless of their shapes or sizes. All of these are within the scope of the present application.

The display cells do not have to be aligned with the pixel electrodes since all display cells are filled with a display fluid of the same composition. As shown in FIG. 8, the display cells (80) are not aligned with the pixel electrodes (82). However the color filters (83), the sub-pixels (84) and the pixel electrodes (82) are aligned.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device comprising:
   (a) an electrophoretic medium comprising a first type of particles, a second type of particles and a third type of particles, all dispersed in a solvent or solvent mixture; the first, second and third types of particles having respectively first, second and third optical characteristics differing from one another; the first type of particles having a charge of one polarity and the second and third types of particles having charges of the opposite polarity, and the second type of particles having an electric field threshold characteristic; and
   (b) a plurality of pixels wherein each pixel has three sub-pixels, two of the three sub-pixels each has a color filter, wherein the two color filters and the third type of particles have three different colors, and the third sub-pixel has a color filter which is clear and colorless or has no color filter.

2. The device of claim 1, wherein the first type of particles and the second type of particles are of the white and black colors, respectively.

3. The device of claim 1, wherein the third type of particles is non-white and non-black.

4. The device of claim 3, wherein the third type of particles is of a color selected from the group consisting red, green, blue, magenta, yellow and cyan.

5. The device of claim 1, wherein the optical characteristic is color state.

6. The device of claim 1, wherein the electrophoretic medium is filled in display cells and sandwiched between a common electrode and a layer of pixel electrodes.

7. The device of claim 1, wherein the three different colors are selected according to the additive or subtractive color system.

8. The device of claim 1, wherein the charge intensity of the third type of particles is less than 50% of the charge intensity of the second type of particles.

9. The device of claim 1, wherein the charge intensity of the third type of particles is 5% to 30% of the charge intensity of the second type of particles.

10. The device of claim 1, wherein the first type of particles is white particles, the second type of particles is black particles and the third type of particles is red particles.

11. A display device comprising
   (a) an electrophoretic medium comprising a first type of particles, a second type of particles, a third type of particles and a fourth type of particles, all dispersed in a solvent or solvent mixture; the first, second, third and fourth types of particles having respectively first, second, third and fourth optical characteristics differing from one another and two of the four types of particles being non-white and non-black; the first type of particles having a high positive charge, the second type of particles having a high negative charge, the third type of particles having a low positive charge, and the fourth type of particles having a low negative charge; and
   (b) a plurality of pixels wherein each pixel has three sub-pixels, one of the sub-pixels has a color filter which color filter and the two types of non-white and non-black particles have three different colors, and the remaining two sub-pixels have color filters which are clear and colorless or have no color filter.

12. The device of claim 11, wherein the optical characteristic is color state.

13. The device of claim 11, wherein the electrophoretic medium is filled in display cells and sandwiched between a common electrode and a layer of pixel electrodes.

14. The device of claim 11, wherein the three different colors are selected according to the additive or subtractive color system.

15. The device of claim 11, wherein the low charged particles have a charge intensity which is less than 75% of the charge intensity of the high charged particles.

16. The device of claim 15, wherein the low positive charged particles have a charge intensity which is less than 50% of the charge intensity of the high positive charged particles and the low negative charged particles have a charge intensity which is less than 75% of the charge intensity of the high negative charged particles.

17. The device of claim 11, wherein the high positive charged particles are black particles, the high negative charged particles are yellow particles, the low positive charged particles are red particles and the low negative charged particles are white particles.

18. The device of claim 7, wherein the three different colors are red, green and blue respectively.

19. The device of claim 10, wherein the color filters of the two sub-pixels are green and blue respectively.

20. The device of claim 17, wherein the color filter for the sub-pixel is blue.

* * * * *